United States Patent Office 2,907,663
Patented Oct. 6, 1959

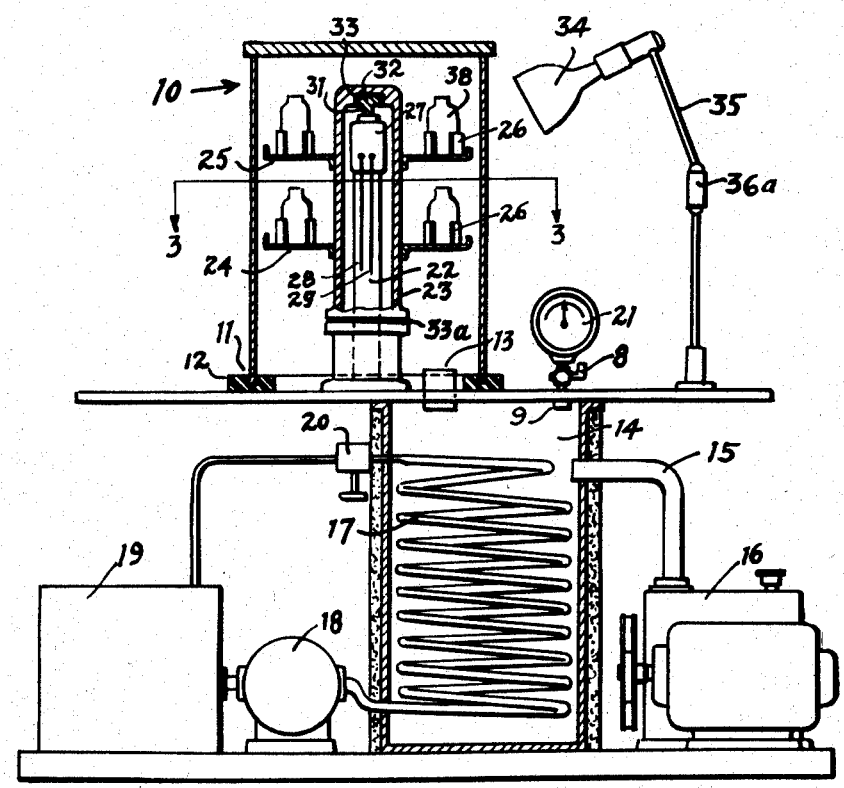
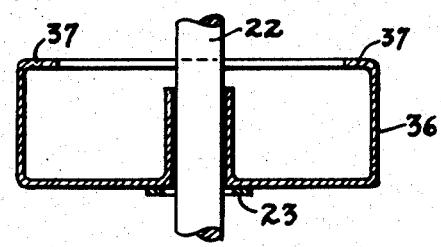
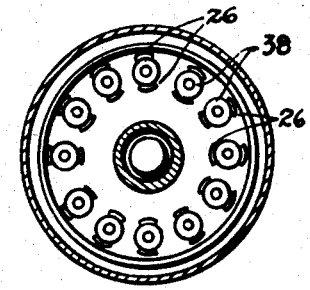

2,907,663

METHOD OF DEHYDRATION OF NORMALLY LIQUID FOOD MATERIAL

Martin C. Parkinson and Douglas Fraser, Yonkers, and Charles E. Bender, Hastings on Hudson, N.Y.

Application February 21, 1957, Serial No. 641,764

10 Claims. (Cl. 99—199)

This invention relates to a method of dehydrating normally liquid heat-sensitive material and is particularly applicable to dehydration of food materials such as orange or other fruit juices, milk and the like as well as to dehydration of hormone and other organic drug products.

The method of this invention has a number of important advantages over the methods previously used which will be detailed herein.

Where material is dehydrated the major fraction of the water is removed and the material reduced to powder form. The powder, which is considerably less bulky and less apt to spoil, is transported to the user who adds water thereto to reconstitute the original food material.

Unfortunately, in the case of food material such as fruit juices, milk and the like, the conventional methods of removal of water have left the powder with a definite "dehydrated" taste. Thus, when the material is reconstituted by the user, the taste of the fresh product is not restored. In the case of organic drug products, where taste is not a problem, the conventional methods of water removal have tended to destroy vitamins, hormones, enzymes, etc.

Where it has been vitally necessary to avoid destruction of a drug product, and where powder form has been mandatory and cost is no factor, the method of "freeze drying" has been employed. In this method the liquid is subjected to refrigeration to a point below its freezing point. Thereafter the pressure is substantially reduced and radiant heat is applied to dry the material.

The process described above is, as can be seen, a very costly one. Two stages of processing are required.

The conventional process set forth above cannot be carried out in one stage since reduction of pressure above a liquid will cause the liquid to froth and foam. The liquid will then spatter out of the container and large losses will occur.

It is also pointed out that in the conventional process the higher the temperature that can be employed (provided that this temperature is below the point where destruction of the material takes place) the more rapid the process occurs. Similarly the lower the pressure that can be used the more rapid is the process.

Understanding the difficulties involved in the prior processes we have devised a new process which is disclosed in this specification. This process is rapid enough to be applicable to commercial operations and compares favorably in cost (when the results are considered) with the conventional processes. The process permits removal of water from the materials involved without causing the characteristic dehydrated taste in the case of food materials nor loss of vitamins, hormones, enzymes, etc., in the case of drug products.

Before continuing with this exposition it is pointed out that the word "dry" which is used in this specification and in the claims herein to describe the powder material produced by dehydration of the original material does not means that 100% of the original water has been removed. The material still contains moisture. The word "dry" merely refers to the fact that the material is now in the physical state of powder.

The method of this invention may be briefly described as comprising the steps of placing the material under reduced pressure, reducing the temperature to at least a point only slightly above the freezing point of the material and applying centrifugation and radiant heat thereto until the material is "dry" (i.e. reduced to powder form).

In the preferred modification of this invention the material is placed under reduced pressure of no more than .2 mm. and under reduced temperature at least below the freezing point of the material and centrifugation of at least 500 r.p.m. is applied to the material until it is frozen. At that point the velocity of centrifugation is substantially reduced, the temperature and pressure conditions are maintained, and radiant heat is applied to the material until it is dry.

The pressures used range from .2 mm. to .0001 mm. in the preferred modification with the optimum pressure being .005 mm. The initial speed of centrifugation, in the preferred modification ranges from 500 to 2500 r.p.m. with the optimum speed being about 1400 r.p.m. The final speed of centrifugation, after the material has been frozen, ranges from 50 r.p.m. to 1 r.p.m. with the preferred optimum speed being 3 r.p.m.

The temperatures used depend upon the material operated upon and range from 10° C. to —40° C.

The method of this invention will now be further described by reference to the drawings which show an apparatus which may be used to carry out this method. However the apparatus per se is not claimed in this application but is claimed in a co-pending application Serial Number 640,380 filed February 15, 1957.

Fig. 1 is a sectional view through the apparatus that may be used to carry out the method of this invention.

Fig. 2 is a detail view of a form of container for the liquid food material that is to be dehydrated.

Fig. 3 is a sectional view through the apparatus taken along lines 3—3 of Fig. 1 showing another form of container to hold the liquid food material to be dehydrated.

In the apparatus shown a container 10 is provided which is adapted to be placed under reduced pressure and temperature. Container 10 is made of transparent material such as glass. At its bottom portion 11 a seal 12 is provided which is preferably made of resilient rubber or rubber-type material.

A conduit 13 passes through seal 12 and also opens into container 14 which is made of metallic conductive material. An additional conduit 15 also opens into container 14 and in turn is secured to vacuum pump 16.

A coil 17 which bears an expanding refrigerant is disposed about container 14. Coil 17 in turn is connected to compressor 18 and condenser 19. The conventional valve 20 regulates the flow of refrigerant into coil 17. A gauge 21 is provided to indicate the pressure within containers 10 and 14 and a thermometer (not shown) may also be provided to indicate the temperature.

A fixed vertical support 22 is centrally located within container 10. A rotatable vertical support 23 is disposed above support 22 and bears shelves 24 and 25 thereupon. Bottle holding supports 26 are disposed in spaced relationship upon shelves 24 and 25.

A motor 27 is disposed within support 22 and is formed with wires 28 and 29 which pass through seal 12 and are connected to a power source (not shown). A switch (not shown) [which also serves as a rheostat] is provided between wire 28 and the power source.

Motor 27 bears shaft 31 which bears key portion 32 at its upper end thereof. Key portion 32 fits into a mating groove 33 located within rotatable support 23. A bearing 33 is disposed between fixed shaft 22 and rotatable support 23.

A radiant heat device consisting of an infra-red incandescent bulb 34 is located without container 10 and is supported upon support 35. A socket 36a is provided upon support 35 so that bulb 34 can be directed into ray impinging relationship with the liquid food material or other heat-sensitive material treated. Bulb 34 is also connected to a power source (not shown) and switch means and rheostat means (not shown) are also provided to turn bulb 34 on and off and to control the intensity of the heat produced.

Fig. 2 of the drawings shows the form of material container that may be used where a large volume of material is to be dried. (The examples of the process of this invention are carried out with this form of container.) As shown herein a cylindrical container 36 bearing offset portions 37 is secured to support 23.

In order to vent the apparatus to the atmosphere and to break the vacuum therein when the dried material is to be removed from the apparatus an additional conduit 9 is provided which connects container 14 to the atmosphere. A valve 8, which is normally closed, is disposed within conduit 9. If valve 8 is opened then atmospheric air rushes into container 14 and thus vents the apparatus.

The invention will be further described by reference to specific examples of the practice thereof which will be illustrated by reference to the apparatus described.

*Example 1*

2000 cc. of fresh squeezed orange juice was placed within cylindrical container 36 which was then placed upon support 23. Container 10 was then placed upon seal 12, valve 8 was closed, and pump 16 started to reduce the pressure to approximately .005 mm. At the same time compressor 18 was started so as to reduce the temperature to approximately −20° C. Also, at the same time, motor 27 was started so as to rotate container 36 to about 1450 r.p.m.

The rotation of container 36 was continued for about five minutes. At the end of this time the orange juice had frozen. The speed of rotation of container 36 was then reduced to approximately 3 r.p.m. and bulb 34 was turned on and directed upon the frozen orange juice. The latter conditions were continued for a period of approximately seven hours. At the end of this period the orange juice was reduced to a powder.

Pump 16, compressor 18, motor 27, and bulb 34 were then turned off and valve 8 opened to vent the apparatus to the atmosphere. Container 10 was then removed from seal 12, container 36 was removed from support 23 and the powder removed from container 36 and placed in a jar.

The powdered orange juice, upon being reconstituted to liquid form by the addition of water, was indistinguishable in taste from fresh orange juice.

*Example 2*

2000 cc. of fresh milk was placed within cylindrical container 36 which was then placed upon support 23. Container 10 was then placed upon seal 12, valve 8 was closed, and pump 16, compressor 18, and motor 27 were started so as to produce a pressure of approximately .005 mm., a temperature of approximately −20° C. and a rotational speed of approximately 1450 r.p.m.

The material was maintained under these conditions for approximately 10 minutes when the milk became frozen. The speed of rotation was then reduced to 5 r.p.m. and bulb 34 was turned on and directed upon the frozen milk. The latter conditions were maintained for approximately seven hours when the milk was reduced to a powder.

Pump 16, compressor 18, motor 27, and bulb 34 were then turned off and valve 8 opened to vent the apparatus to the atmosphere. Container 10 was then removed from seal 12, container 36 was removed from support 23 and the milk powder removed from container 36 and placed in a jar.

The powdered milk, upon being reconstituted to liquid form by the addition of water, was indistinguishable in taste from fresh milk.

*Example 3*

2000 cc. of bovine amniotic fluid was placed within cylindrical container 36 which was then placed upon support 23. Container 10 was then placed upon seal 12, valve 8 was closed, and pump 16, compressor 18, and motor 27 were started so as to produce a pressure of approximately .005 mm. a temperature of approximately −20° C. and a rotational speed of approximately 1450 r.p.m.

The material was maintained under these conditions for approximately 15 minutes when the bovine amniotic fluid became frozen. The speed of rotation was then reduced to approximately 5 r.p.m. and bulb 34 turned on and directed upon the frozen bovine amniotic fluid. The latter conditions were maintained for approximately 12 hours when the bovine amniotic fluid was reduced to powder.

Pump 16, compressor 18, motor 27, and bulb 34 were then turned off and valve 8 opened to vent the apparatus to the atmosphere. Container 10 was then removed from seal 12, container 36 was removed from support 23 and the powdered bovine amniotic fluid removed from container 36 and placed in a jar.

*Example 4*

2000 cc. of freshly brewed coffee was cooled to room temperature and placed within cylindrical container 36 which was then placed upon support 23. Container 10 was then placed upon seal 12, valve 8 was closed, and pump 16, compressor 18, and motor 27 was started to produce a temperature of approximately 10° C., a pressure of approximately .005 mm. and a rotational speed of approximately 1450 r.p.m.

After the temperature was reduced to approximately 10° C. [and it was not permitted to go below the freezing point of the coffee brew] bulb 34 was turned on and directed upon the coffee brew.

After a period of approximately 30 minutes the coffee was reduced to a powder.

Pump 16, compressor 18, motor 27 and bulb 34 were then turned off and valve 8 opened.

Container 10 was then removed from seal 12, container 36 was removed from support 23 and the powdered coffee removed from container 36 and stored in a jar for future use.

Upon water being added to the powdered coffee in order to reconstitute the brew all of the original flavor of the coffee brew was retained.

We claim:

1. A method of dehydrating normally liquid food material without affecting its rehydrated taste comprising placing said material within a transparent container under reduced pressure of no more than .2 mm. and subjecting said material to a temperature no greater than 0° F., and applying centrifugation to said material of at least 500 r.p.m. until the material is frozen, thence substantially reducing the velocity of centrifugation while maintaining the other conditions and applying radiant heat from outside said container to said material until it is dry.

2. A method of dehydrating normally liquid food material without affecting its rehydrated taste comprising placing said material within a transparent container under reduced pressure of no more than .005 mm., subjecting said material to a temperature no greater than −10° F. and applying centrifugation to said material of at least 1000 r.p.m. until the material is frozen, thence substantially reducing the velocity of centrifugation while maintaining the other conditions and applying radiant heat from outside said container to said material until it is dry.

3. A method of dehydrating normally liquid food material without affecting its rehydrated taste comprising placing said material within a transparent container under reduced pressure of no more than .005 mm., subjecting said material to a temperature no greater than −10° F. and applying centrifugation to said material of at least 1000 r.p.m. until the material is frozen, thence reducing the velocity of centrifugation to no more than 50 r.p.m. while maintaining the other conditions and applying radiant heat from outside said container to said material until it is dry.

4. A method of dehydrating normally liquid food material without affecting its rehydrated taste comprising placing said material within a transparent container under reduced pressure of no more than .005 mm., subjecting said material to a temperature no greater than −15° F. and applying centrifugation to said material of at least 1400 r.p.m. until the material is frozen, thence reducing the velocity of centrifugation to no more than 10 r.p.m. and applying radiant heat from outside said container to said material until it is dry.

5. A method of dehydrating normally liquid food material without affecting its rehydrated taste comprising placing said material in a transparent sealed container, maintaining said container under reduced pressure of no more than .005 mm. and at a temperature no greater than −15° F. and applying centrifugation to said material of at least 1400 r.p.m. until the material is frozen, thence reducing the velocity of centrifugation to no more than 10 r.p.m. and applying radiant heat to said material from a source without said container until the material is dry.

6. A method as described in claim 5 wherein the food material is orange juice.

7. A method as described in claim 5 wherein the food material is milk.

8. A method of dehydrating normally liquid heat-sensitive material comprising placing said material under reduced pressure, reducing the temperature to a point at least slightly above the freezing point of said material, and applying centrifugation and radiant heat thereto until the material is dry.

9. A method of dehydrating normally liquid heat-sensitive material comprising placing said material under reduced pressure, subjecting it to a temperature below its freezing point, and applying centrifugation thereto until the material is frozen, thence substantially reducing the velocity of centrifugation while maintaining the other conditions and applying radiant heat to said material until it is dry.

10. A method of dehydrating normally liquid heat-sensitive material comprising placing said material under reduced pressure of no more than .2 mm. and subjecting said material to a temperature below its freezing point and applying centrifugation to said material of at least 500 r.p.m. until the material is frozen, thence substantially reducing the velocity of centrifugation while maintaining the other conditions and applying radiant heat to said material until it is dry.

References Cited in the file of this patent

UNITED STATES PATENTS 2,388,917   Hormel _____ Nov. 13, 1945

OTHER REFERENCES

Flosdorf: Food Industries, January 1945, pp. 92 to 95, 168, 170, 172, 174, 176 and 178.

Chambers: Manufacturing Chemist and Manufacturing Perfumer, February 1949, vol. XX, No. 2, pp. 75, 76, 77.